United States Patent [19]

Nakamura et al.

[11] 3,808,806
[45] May 7, 1974

[54] EXHAUST GAS PURIFYING DEVICE

[75] Inventors: Hirokazu Nakamura; Tadahiko Ito, both of Kyoto, Japan

[73] Assignee: Mitsubishi Jidosha Kogyo Kabushiki Kaisha, Tokyo, Japan

[22] Filed: Apr. 28, 1972

[21] Appl. No.: 248,756

[30] Foreign Application Priority Data
May 11, 1971  Japan.............................. 46-36966

[52] U.S. Cl................ 60/288, 23/288 F, 60/301, 60/302, 60/284, 60/289
[51] Int. Cl................................................ F01n 3/14
[58] Field of Search ............ 60/301, 302, 288, 284, 60/300, 289; 23/288 F

[56] References Cited
UNITED STATES PATENTS

| | | | |
|---|---|---|---|
| 3,086,839 | 4/1963 | Bloch | 60/288 |
| 3,273,971 | 9/1966 | Baddorf | 60/288 |
| 3,017,255 | 1/1962 | Norris | 60/302 |
| 3,124,930 | 3/1964 | Powers | 60/302 |
| 3,166,895 | 1/1965 | Slayter | 60/302 |
| 3,228,746 | 1/1966 | Howk | 60/301 |
| 3,247,666 | 4/1966 | Behrens | 60/302 |
| 3,644,098 | 2/1972 | Palma | 423/213 |
| 3,662,540 | 5/1972 | Murphey | 60/274 |

FOREIGN PATENTS OR APPLICATIONS
933,943   8/1963   Great Britain....................... 60/302

*Primary Examiner*—Douglas Hart
*Attorney, Agent, or Firm*—Bosworth, Sessions & McCoy

[57] ABSTRACT

An exhaust gas purifying device for use in an internal combustion engine, which has an inlet for introducing exhaust gas exhausted from each cylinder of the engine, a thermal reaction chamber for reburning the exhaust gas, and a catalytic chamber provided immediately upstream of said thermal reaction chamber, said inlet and catalytic and reaction chambers forming or acting as a manifold for the exhaust gas. Thus, detrimental components contained in the exhaust gas may be effectively reduced with the compact device.

2 Claims, 5 Drawing Figures

PATENTED MAY 7 1974　　　　　　　　3,808,806

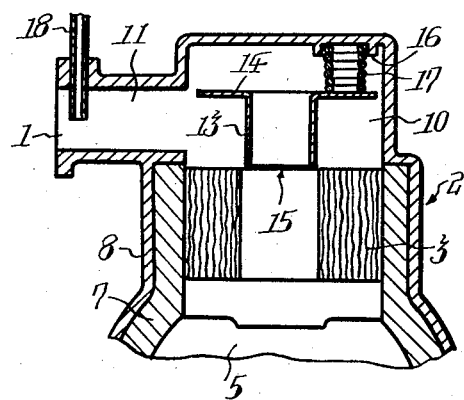
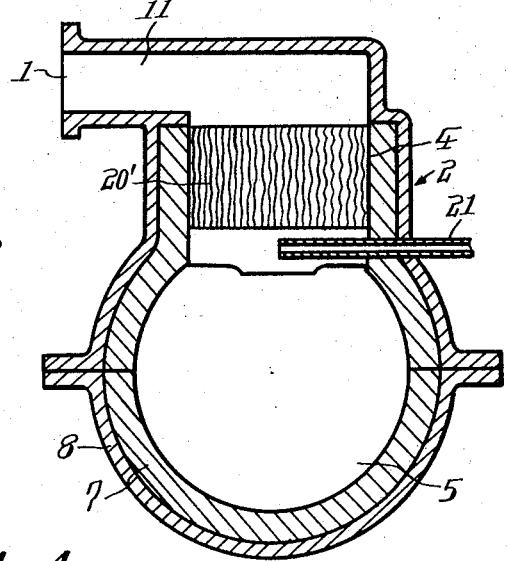
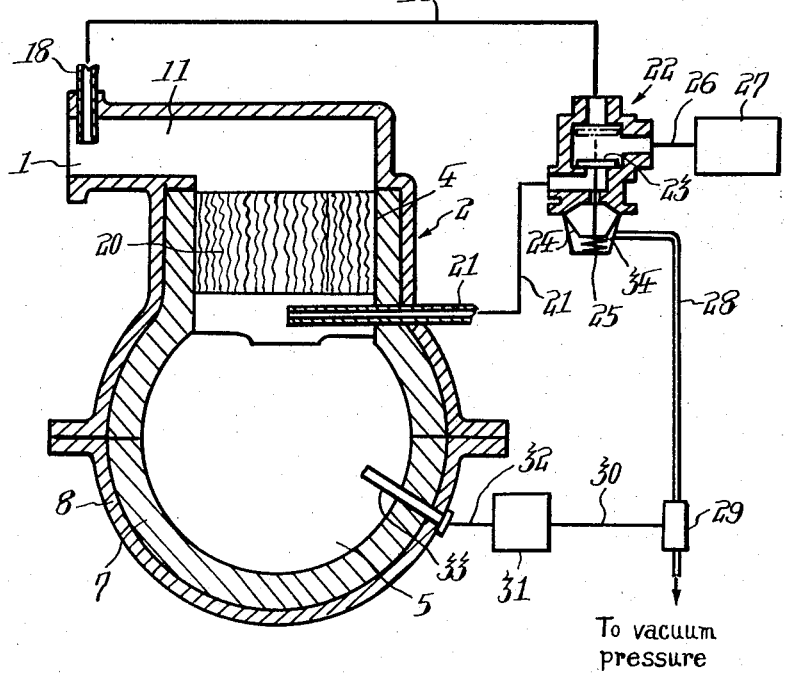

EXHAUST GAS PURIFYING DEVICE

BACKGROUND OF THE INVENTION

This invention relates to an exhaust gas purifying device for an engine, and more particularly to an exhaust gas purifying device for an engine which obtains power by burning fuel, such as gasoline, light oil, or liquefied petroleum gas.

Recently, the atmospheric pollution caused by the exhaust gas of automobiles, particularly that caused by hydrocarbons and carbon monoxide retained in the exhaust gas has become an important problem, and effective purifying of exhaust gases has been demanded. One known type of exhaust gas purifying device is a thermal reactor made of refractory material such as refractory steel for burning hydrocarbons and carbon monoxide retained in the exhaust gas by oxygen retained similarly in the exhaust gas or by a supply of secondary air. Also, it is known to use a catalyst for promoting gas purification. However, the former solution has a disadvantage in that the oxidation reaction during warming-up of an engine, that is the low temperature operation thereof, is not sufficiently active for proper purification purposes. In the latter solution, a catalyst, particularly a catalyst effective under low temperature conditions, is short lived. Furthermore, the conventional purification devices of the abovementioned types are in general relatively large or bulky and therefore provide a problem of location when arranged in the relatively limited space of an automobile.

SUMMARY OF THE INVENTION

The present invention provides an exhaust gas purifying device comprising a thermal reactor as its main component, and a catalyst unit upstream of the thermal reactor, said device serving also as an exhaust manifold of an engine. According to the present invention, advantages such as simplification in construction, ease of maintenance, improved purification efficiencies, and so on are obtained.

BRIEF DESCRIPTION OF THE DRAWINGS

The other features and advantages of the present invention will become apparent from the following description taken in conjunction with the accompanying drawings, in which:

FIG. 3 is a sectional view of a part of the device when the exhaust gas is at low temperature;

FIG. 4 is a schematic sectional view of a second embodiment of the present invention; and FIG. 5 is a sectional view of a third embodiment of the present invention.

DESCRIPTION OF THE PREFERRED EMBODIMENTS

Now, the present invention will be explained with the illustrations in FIGS. 1 through 5.

Figure 1:
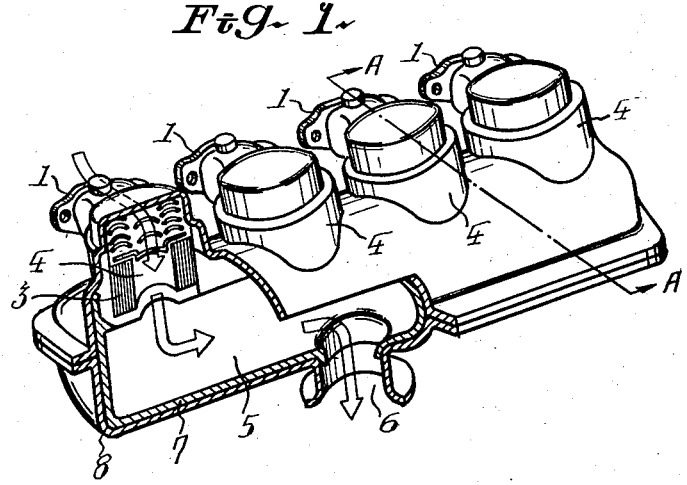
FIG. 1 is a perspective view of a first embodiment of the exhaust gas purifying device partly cut out according to the present invention.
Figure 2:
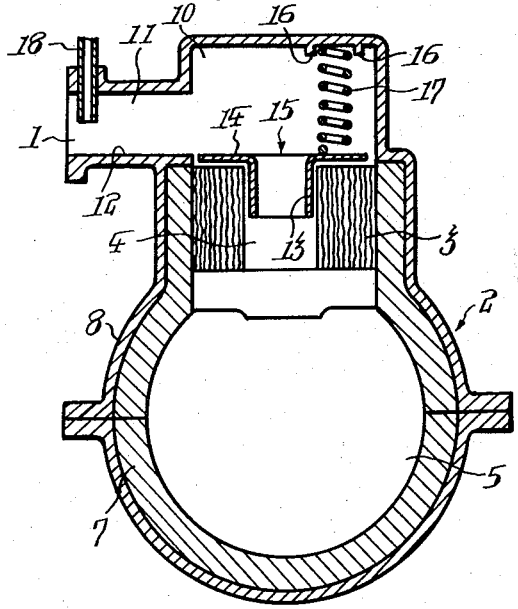
FIG. 2 is a sectional view of the exhaust gas purifying device taken along a line A—A in FIG. 1 showing the state when the exhaust gas is at high temperature.

FIGS. 1 – 3 show the first embodiment of the present invention. In FIG. 1, the invention is shown as being adapted to a 4-cylinder engine.

Gas exhausted from the respective cylinders (not shown) of the engine is introduced from an inlet 1 connected to an exhaust pipe of the respective cylinders into an exhaust gas purifying device 2. The introduced exhaust gas contains detrimental components such as carbon monoxide, hydrocarbons, sulfur dioxide, and is introduced from the respective inlets 1 through a catalytic chamber 4 disposed with a cylindrically shaped catalyst unit 3 for promoting an oxidizing reaction therein, into a reaction chamber 5 so as to reburn the gas to reduce the detrimental components. Then, the purified gas having had its detrimental components reduced is exhausted from an outlet 6 of the reaction chamber 5 through a silencer (not shown) into the atmosphere.

This exhaust gas purifying device 1 acts also as an exhaust manifold for introducing gas passing the respective catalytic chamber 4 to the reaction chamber 5. Then, in order to raise the efficiency of reburning, the walls of the catalytic chamber 4 and the reaction chamber 5 are made in double structure of inner and outer walls 7 and 8, and particularly the inner wall 7 is made of refractory steel so as not to allow the heat of the interior thereof to escape.

Referring now to FIG. 2, which shows the section of the exhaust gas purifying device taken along the line A—A in FIG. 1 illustrating the state when the temperature of the exhaust gas is at high temperature, the invention will further be described in detail. The inlet 1 communicates with the side surface of extended space 10 of the catalytic chamber 4 through a conduit 11 formed integrally witth the outer wall 2. The catalytic chamber 4 disposed with the catalyst 3 in hollow cylinder is provided under the lowermost portion 12 of the conduit 11 near the reaction chamber 5. A cylinder 13 is slidably inserted into the hollow portion of the catalyst 3 in the extended space 10, and a slide valve 15 is formed with a collar 14 integral with the cylinder 13. A heat responsive spring 17 made of, for example, bi-metal is provided between the collar portion 14 of the slide valve 15 and the upper surface of the extended space 10, one end of the spring being engaged with an engaging portion 16 formed integral with the outer wall 8 and the other end of which is secured to the collar portion 14. Further, a pipe 18 is provided near the inlet 1 so that the end of the pipe 18 reaches near the central axis of the conduit 11. Secondary air is taken into the conduit 11 by the pipe 18 to be mixed with the exhaust gas containing detrimental components introduced from the inlet 1. The collar portion 14 of the slide valve 15 has sufficient width to cover the upper surface of the catalyst 3.

In operation of this exhaust gas purifying device 2, when the engine is inoperative so that it is cool, the slide valve 15 of the exhaust gas purifying device 2 is disposed at the upper portion of the extended space 10 as shown in FIG. 3 so that the gas introduced into the conduit 11 passes to the catalyst 3. It follows that in the cool state of the engine the heat responsive spring 17 is contracted and, accordingly, the slide valve 15 connected to the heat responsive spring 17 takes an uppermost position in the extended space 10, to prevent the direct flow from conduit 11 to the center space of the catalyst 3 by the sleeve 13.

If the engine is started at this time, the temperature of the exhaust gas is low so that the heat responsive spring 17 is contracted and the exhaust gas containing the detrimental components introduced from the inlet 1 is mixed with the secondary air introduced through the pipe 18 and flows through the catalyst 3 into the reaction chamber 5. Accordingly, the exhaust gas of low temperature is not directly introduced into the reaction chamber 5, but flows through the catalyst 3 with the result that an oxidizing reaction is promoted by the catalyst. Since the catalysts 3 are arranged just above the respective cylinders of the engine, they are rapidly heated on starting of the engine. Therefore, the temperatures of the catalysts reach their optimum value soon. This fact eliminates any necessity for using conventional additional heating means for catalysts.

After the engine is started, the temperature of the exhaust gas gradually increases with time and the heat responsive spring 17 is extended. If the exhaust gas reaches a predetermined temperature, the heat responsive spring 17 is sufficiently extended so that it contacts the slide valve 15 with the upper surface of the catalyst 3 as shown in FIG. 2. Accordingly, in such state, the exhaust gas does not flow through the catalyst 3, but passes through the central hollow portion of the cylinder 13 of the slide valve 15 into the reaction chamber 5 where it is reburned so that the gas is purified. The collar 14 of the slide valve covers the catalyst 3, in order not to pass the gas flow therethrough. Thus, at high temperatures of the engine, the catalyst 3 is not exposed to exhaust gas of high temperature so as to increase its life. The slide valve 15 acts as a switch which is switched by the heat responsive spring 17.

Reference is now made to FIG. 4, which shows the second embodiment of the present invention. In this embodiment, a catalyst 20 is fills the catalytic chamber 4, and a secondary pipe 21 is provided for supplying secondary air downstream of the catalyst 20 or at the reaction chamber 5. The detailed description will be omitted with respect to the structure and parts in this embodiment which are the same as those of the device shown in FIG. 2 and bear the same reference numerals.

The pipe 18 is connected to one of two outlet ports of a secondary air change-over valve device 22 through 18', and the pipe 21 is connected to the other outlet port of the device 22 through 21'. An inlet port of the device is connected through a pipe line 26 to a suitable air source such as an air pump. In the valve device 22, there is a valve member 23 which determines the communication between the air pump 27 and pipe 18 (solid line position in FIG. 4) or that between the air pump 27 and pipe 21 (dotted line position thereof). An actuating chamber 25 is formed by a diaphragm 24 at the lower part of the valve device. The diaphragm 24 is connected to a stem of the valve member 23. The actuating chamber communicates with the vacuum pressure of a suction tube (not shown) through a pipe line 28. A return spring 34 is provided for the valve member. In the pipe line 28, there is provided an ON-OFF switch 29 which is controlled by the control signal coming from a control box 31 through a line 30. The control box 31 has an input connected to a temperature sensor 33 through a line 32.

In this embodiment, the exhaust gas always passes through the catalyst 20 to the reaction chamber 5 regardless of whether it has a low or high temperature. Then, the position of the secondary air is changed depending upon the temperature of the exhaust gas. At low temperatures of the exhaust gas, the valve 23 of the valve device 22 is in the lower position under the vacuum from the pipe line 28, and, accordingly, the secondary air is blown near the inlet 1 for the exhaust gas through the pipe 18 so that the exhaust gas mixed with the secondary air is blown into the catalyst 20 and strengthens the reaction to sufficiently purify the exhaust gas at low temperature.

When the exhaust gas is at higher temperature so that the temperature of the reaction chamber 5 is sufficiently high, such higher temperature is detected by the temperature sensor 33 which controls the closure of the ON-OFF switch 29, so as to prevent the supply of vacuum to the actuating chamber 25 of the valve device 22. Then, the valve member 23 is shifted to its upper position (dotted line) by the action of the return spring 34. Accordingly, the exhaust gas of high temperature passes through the catalyst 20 and is mixed with the secondary air as they are introduced into the reaction chamber 5 to promote oxidation in the reaction chamber 5 while at the same time weakening the reaction in the catalyst 20 so as to prevent the catalyst from deteriorating.

Although the change-over control of this embodiment depends directly on the exhaust gas temperature or the inside temperature of the reaction chamber 5, the change-over may be effected, as a modification, by merely using a timer which, for example, changes over the secondary air from the pipe 18 to the pipe 21 after appropriate time, such as two minutes from starting.

As another modification, the catalyst 20 may be a reducing catalyst of nitrogen oxides and also promotes the oxidation of carbon monoxide. The secondary air supply from the pipe 18 is continued up to an appropriate period after the starting of the engine (for example, up to the time when the temperature of the inside of the reaction chamber or that of the cooling water reaches a predetermined temperature, or up to a predetermined period given by a timer), so that the carbon monoxide and hydrocarbons are oxidized by the catalyst 20. Thus, preliminary oxidized gas is further reburned in the reaction chamber 5. After an appropriate predetermined time has lapsed, the secondary air supply to the pipe 18 is stopped by the action of a valve device. Then, the catalyst 20 acts as a reduction catalyst for the reduction of the nitrogen oxides, whereas the oxidation of carbon monoxide and hydrocarbons still continues in the reaction chamber 5.

In this case, it is a matter of choice whether the secondary air from the pipe 21 is supplied immediately after the starting of the engine or with an appropriate time lapse after the starting as in the second embodiment.

FIG. 5 shows a third embodiment. This embodiment is not provided with the pipe 18 as shown in the second embodiment. The same reference numerals are given to similar parts. The catalyst 20' is a reduction catalyst for nitrogen oxides.

In this embodiment, gas exhausted from the respective cylinders (not shown) of an engine is introduced from the inlet 1 connected to the exhaust pipe of the respective cylinders into an exhaust gas purifying device 2. The introduced exhaust gas contains detrimental components such as carbon monoxide, hydrocarbons, nitrogen oxides, and is introduced from the respective inlets 1 through a catalytic chamber 4 disposed with a catalyst 3 for promoting the reduction of nitrogen oxides therein, into a reaction chamber 5 so as to reburn the carbon monoxide and hydrocarbons to reduce the detrimental components. Then, the purified gas having fewer detrimental components is exhausted from an outlet 6 of the reaction chamber 5 through a silencer (not shown) into the atmosphere.

In this case, there is no need to arrange any change-over means for the secondary air.

While the present invention has been particularly shown and described with reference to some preferred embodiments, it will be understood by those skilled in the art that the foregoing and other changes in form and details may be made therein without departing from the spirit and scope of the invention.

What is claimed is:

1. An exhaust gas purifying device comprising an inlet for introducing exhaust gas from an engine, a catalytic chamber communicating with said inlet and having a catalyst for promoting an oxidizing reaction of the exhaust gas, said catalyst having a cylindrical shape with a hollow core portion, a thermal reaction chamber provided downstream of the catalytic chamber, and switching means for providing alternate paths for said exhaust gas to promote the oxidizing reaction of the exhaust gas by the catalyst when the exhaust gas is at low temperature and to bypass the exhaust gas to the reaction chamber when the exhaust gas is at high temperature, said switching means comprising a slide valve having a collar which covers the upper surface of said cylindrical catalyst and a cylindrical portion which is slidably inserted into said hollow core portion, and a heat responsive spring means.

2. An exhaust gas purifying device as claimed in claim 1, further comprising a secondary pipe means provided for supplying secondary air to said catalytic chamber.

* * * * *